Patented Jan. 28, 1930

1,744,958

UNITED STATES PATENT OFFICE

GEORGE W. FREIBERG, OF ST. LOUIS, MISSOURI

FERMENTATION PROCESS FOR PRODUCING ACETONE AND BUTYL ALCOHOL

No Drawing.     Application filed April 14, 1927.   Serial No. 183,921.

This invention relates to the manufacture of neutral products like acetone and butyl alcohol, and has for its main object to provide a highly efficient and economical fermentation process for producing such products.

In one fermentation process that has heretofore been used in the production of acetone and butyl alcohol, maize is ground in a dry state and the dry meal is then converted into a mash, which subsequently is fermented with or without the admixture of other fermentable material. I have discovered that it is not essential to use the entire grain or corn of the maize in preparing the mash that is used in a process of the general character above referred to, and that a considerable saving can be effected without injuring or reducing the quality of the acetone or alcohol produced by the process, if the mash is prepared by using only a sufficient amount of the nutrient material in the grain to assure the fermentation of the carbohydrate-containing material, thereby enabling the germ and oil of the grain to be used for other purposes. In other words, I have discovered that a satisfactory mash for the production of acetone and alcohol can be prepared from the materials of the maize grain exclusive of the separated germ, and a carbohydrate-containing material, such as the endospermal portion of the grain, with or without the admixture of other fermentable carbon compounds.

Accordingly, I have devised a novel process for producing acetone and butyl alcohol which contemplates subjecting maize grain to such treatment as to effect the separation of all or the major portion of the germ of the grain from the carbohydrate-containing material of the grain, using the maize material, other than the separated germ, as such, or with other fermentable carbon compounds to produce a mash, and then fermenting said mash with micro-organisms. The germ of the grain or corn can either be marketed as such, or the oil in the germ can be removed and refined in any suitable way.

One procedure that can be followed in practising my process is as follows: The maize to be used in the process is placed in a large hopper bottom steeping vat and covered with warm water, which is circulated by means of a pump or other means and maintained at a temperature of about 120° F. to 140° F. Sulphur dioxide, chlorine, mineral acids or similar substances can be added, if desired, so as to inhibit bacterial action. The grain is steeped for about 48 hours or for such a period of time as is necessary to produce the results hereinafter described. When the grain has been steeped for the desired length of time the steep water, which contains a large amount of soluble nutrients, is drawn off and subsequently used in the preparation of the mash, or the steep water can be used to steep a second batch of maize grain, thus concentrating the nutrients which ultimately will be contained therein and producing a mash which is high in nutrient material. The steeped corn is next run through a Foos mill or equivalent device that causes the grain to be cracked, partially ground, or decorticated. This material is then suspended in fresh water or in the water in which the grain has been soaked and passed through a separator, by means of which the germ is floated to the surface and skimmed off, while the remainder of the liquor containing the starchy portion of the grain may either be used directly in the preparation of the mash, which is to be fermented, or it is passed through mills for further grinding, so as to effect the removal of the starchy material adhering to the bran. If the latter procedure is used the material coming from the mill is passed through coarse screens or reels in order to remove the bran. The bran is washed to remove the adhering starch, after which it is pressed to remove the water, and it is then dried. Similarly, the germ is washed, pressed and dried. All washings are saved and conducted into the mixing vat, in which the mash is prepared, the mash being prepared preferably by mixing the steep water or liquor derived from the separator or mill, and all washings of the process. The mash may be diluted as desired, and additional carbohydrate-containing material or fermentable carbon compounds may be added to same. The carbohydrate content of such a mash will usually vary from about 5% to 8%. The mash is cooked and fermented with micro-organisms and the neutral products recovered in the usual manner. Preferably the various units or pieces of apparatus employed to practice the process are arranged so that the liquors and materials pass from one to the other, due to gravity, and the water used to steep the grain is heated, preferably by means of the hot residue flowing from the stills, thus effecting a considerable saving in the quantity of fuel required to carry out the process. In a process of the character above described the major portion of the germ of the grain is recovered and marketed as such, or the oil in the germ can be removed and refined. Accordingly, such a process enables acetone and butyl alcohol to be produced at a materially lower cost than conventional fermentation processes which contemplate using the entire grain of corn or maize, i. e., the germ and the endospermal portion of the grain, to prepare the mash. Moreover, such a process is economical to practise or carry out when the procedure employed is such as to enable the water used to steep the grain to be heated by the hot residue flowing from the stills.

Having thus described my invention, what I claim as new and desire to secure by Letters Patent is:

1. A process for producing acetone and butyl alcohol, characterized by using maize from which most of the germ has been removed to prepare a carbohydrate-containing mash, and fermenting said mash.

2. A process for producing acetone and butyl alcohol, characterized by subjecting maize to such treatment as to effect the separation of the major portion of the germ from the endospermal portion of the grain, using said endospermal portion in a wet condition to prepare a carbohydrate-containing mesh, and fermenting said mash.

3. A process for producing acetone and butyl alcohol, characterized by steeping maize grain, drawing off the steep water, subjecting the residue to such treatment as to effect the separation and recovery of the germ of the grain from the starchy portion of the grain, using the steep water and the wet, starchy portion of the grain in the preparation of a mash, and fermenting said mash and recovering the neutral products from same.

GEORGE W. FREIBERG.